June 29, 1954 R. B. HANER, JR 2,682,639

RADIO COMMUNICATIONS APPARATUS

Filed June 9, 1950

Inventor

R. B. Haner, Jr.

By Neil W. Preston, his Attorney

Patented June 29, 1954 2,682,639

UNITED STATES PATENT OFFICE 2,682,639

RADIO COMMUNICATIONS APPARATUS

Robert B. Haner, Jr., Scottsville, N. Y., assignor to General Railway Signal Company, Rochester, N. Y.

Application June 9, 1950, Serial No. 167,012

2 Claims. (Cl. 332—17)

This invention relates to radio communications apparatus and more articularly pertains to radio transmitters of the kind in which phase modulation of a desired carrier wave is used to convey the desired intelligence.

When a carrier wave is frequency modulated by a signal voltage as in a reactance tube modulated oscillator, the source of the carrier wave cannot have as high a frequency stability as might be provided, for example, by a crystal oscillator because the frequency of such an oscillator cannot readily be varied to produce the desired frequency modulation. For this reason, relatively complex means must generally be provided to maintain the output frequency within prescribed limits. In contrast, phase modulation, by permitting use of a crystal oscillator having a high frequency stability, presents a distinct advantage. Accordingly, an object of this invention is to provide a means for phase modulating a carrier wave with a signal containing the intelligence desired to be transmitted.

Another object of this invention is to provide a means for phase modulating a carrier wave by introducing a signal voltage containing the intelligence to be transmitted directly to an electrode of an oscillator tube.

Other objects, purposes, and characteristic features of the present invention will be in part obvious from the accompanying drawings and in part pointed out as the description of the invention progresses.

Figure 1:
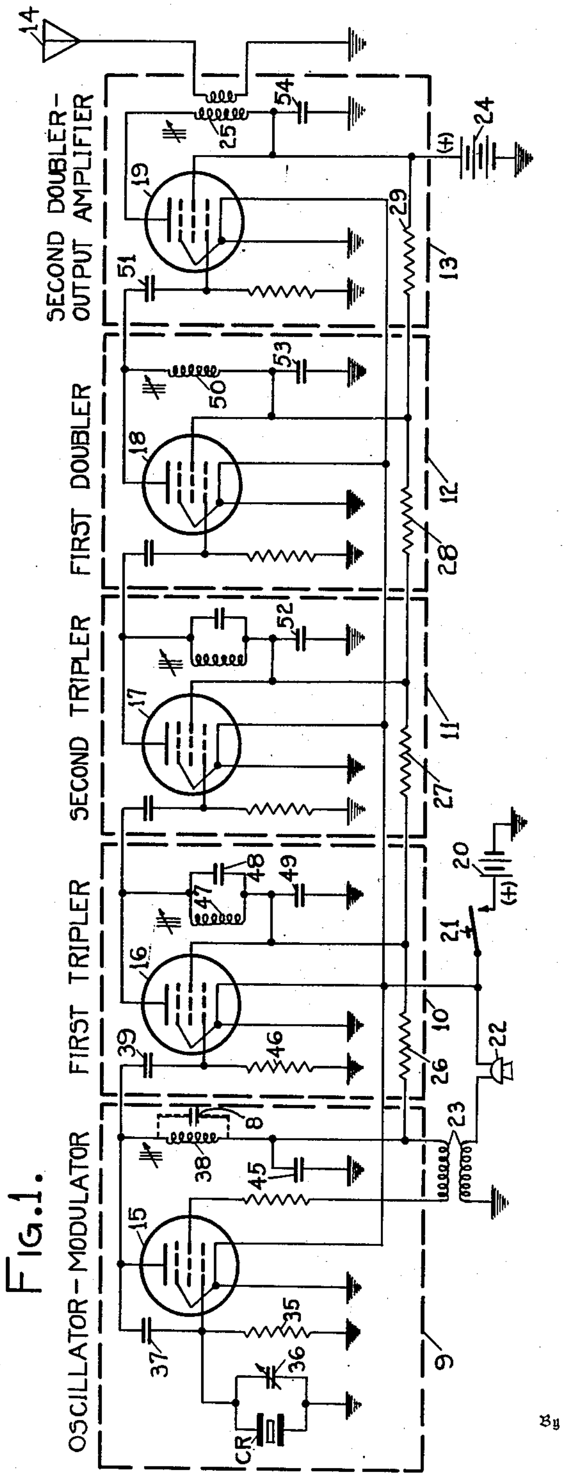
Figure 2:
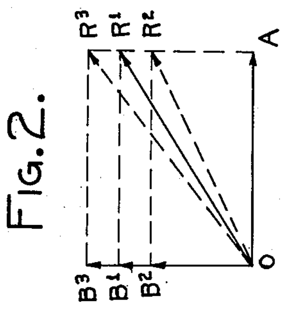

In describing the invention in detail, reference will be made to the accompanying drawings in which:

Fig. 1 illustrates a radio transmitter embodying the principles of the present invention; and Fig. 2 is a vector diagram illustrating a possible theory of operation of the circuit organization producing phase modulation of a radio-frequency wave.

The parts and circuits of this invention are shown diagrammatically and conventional illustrations are used to simplify the drawings and the explanation. The drawings have been made to make it easy to understand the principles and manner of operation rather than to show the specifiic construction and arrangement of parts that would be used in practice.

Fig. 1 illustrates, as one possible embodiment of this invention, the circuit organization of a highly compact transmitter that may be conveniently carried about by a person. A transmitter of this kind is particularly useful in railroad yards in providing instant communication from an individual to a central location. In such a communications system, return communications, i. e., from the central location to the individual are usually broadcast over loud speakers strategically located through the railroad yard. The novel features of this invention, although specifically shown as applied to a portable transmitter, are, however, equally well applicable to any communications device in which a carrier wave is to be modulated by an electrical signal.

As illustrated in Fig. 1, the various stages of the transmitter include an oscillator-modulator 9 including tube 15 that provides an output including a carrier wave having a fixed center frequency and phase modulated by an audio signal. The output of this oscillator-modulator 9 is applied to the input of a tripler 10 which not only amplifies the oscillator-modulator 9 output but also triples the frequency of the oscillator-modulator output signal. The second tripler 11, in turn, amplifies the output of the first tripler in addition to tripling the frequency of the first tripler 10 output. The first doubler 12 operates in a similar manner except that it doubles the frequency of its input signal. The second doubler output amplifier 13 again doubles the frequency of the modulated signal and is operated as a power amplifier stage to provide maximum output to the antenna 14. This combination of frequency triplers and doublers following the oscillator-modulator 9 multiplies the output of the oscillator-modulator 9 by a factor of 36, thereby permitting the oscillator-modulator 9 to operate at a relatively low frequency as compared to the frequency of the transmitter output which may be in the order of several hundred megacycles per second.

The various electron tubes 15, 16, 17, 18, and 19 used in the oscillator-modulator 9 and frequency multiplifiers 10, 11, 12, and 13, respectively, may be of the subminiature type having filamentary cathodes, thereby providing relatively quick operation of these tubes following the energization of their heater circuits. Direct current for energizing the filaments of these tubes is provided by a suitable battery 20 through a contact of press-to-talk switch 21. Closure of this normally open contact also energizes the carbon microphone 22 through the primary winding of microphone transformer 23.

The relatively high potential plate and screen grid voltages for the various tubes are constantly applied even when the transmitter is inactive. These direct voltages are provided for the plate and screen grid electrodes of each electron tube by a battery 24. The screen grid of tube 18, for example, is connected through decoupling resistor 29 to the positive terminal of battery 24 and the plate of this tube is similarly connected through inductance 25. This constant energization of the plate and screen grid electrodes of the various tubes does not cause a steady current drain of battery 24 because the tube filaments are energized only when the transmitter is made active by closing the contact of switch 21.

When no alternating voltage appears across the secondary winding of transformer 23, the screen grid voltage of tube 15 is a direct voltage obtained from the battery 24. If, however, switch 21 is closed so that the microphone circuit is energized, variations of resistance of the carbon particles in the microphone in response to speech or other audio sounds will produce corresponding variations of the direct current through the primary winding of microphone transformer 23. By transformer action, the current variations in the primary winding will cause variations of voltage across the secondary winding to cause the screen grid voltage of tube 15 to vary at an audio rate. The effects of thus varying the screen voltage of this tube will presently be more fully discussed.

With respect to the oscilaltor-modulator 9, the control grid of tube 15 is connected to ground through a grid leak resistor 35 and also through crystal CR which is shunted by variable condenser 36. The control grid is also connected through a condenser 37 to the plate. The plate and screen grid are provided with a direct voltage as has been described. The plate-cathode circuit of tube 15 includes inductance 38 which may be considered to be shunted by its distributed capacitance as represented by the capacitor 8 connected by dotted lines in shunt with the inductor 38 thereby forming a parallel tuned circuit resonant to the desired output frequency of oscillator-modulator 9. The tuning of this parallel tuned circuit is accomplished by varying the permeability of its core as indicated by the conventional symbol adjacent inductance 38. A conventional ladder-type decoupling filter including resistors 26, 27, 28, and 29 and condensers 45, 49, 52, 53, and 54 is provided to minimize feedback effects between the various stages.

The oscillator portion of the oscillator-modulator as shown in Fig. 1 may be of a conventional kind. Satisfactory operation has been obtained using a tuned grid-tuned plate oscillator, and for this reason an oscillator of this kind is shown in Fig. 1. The tuned circuit in the grid-cathode circuit of tube 15 includes the piezoelectric crystal CR shunted by condenser 36. Condenser 36 shunting crystal CR permits variation of the resonant frequency of the tuned grid circuit over a relatively small range. Condenser 37 connected between the grid and plate of tube 15 provides sufficient feedback between the grid and plate circuits to permit sustained oscillation. Grid-leak bias to provide class C operation is obtained by the use of grid resistor 35. Because the instantaneous grid-cathode voltage is positive for only a relatively small portion of each cycle of the input voltage in normal class C operation, some means must be provided to hold a steady bias on the grid of tube 15 when no grid current is drawn by this tube. Thus, when the instantaneous grid-cathode voltage of tube 15 is negative so that no grid current is drawn, the discharge of condenser 36 causes a current flow through resistor 35 to maintain the bias level required for class C operation of this tube. The required bias voltage could also, of course, be provided by a fixed source of voltage such as a battery but a self-bias as shown is deemed preferable.

The description to be given here presents a possible theory of operation as to the manner in which a phase modulated carrier is produced in the plate-cathode circuit of oscillator-modulator 9. The frequency of the carrier oscillations is primarily determined by a frequency of vibration of piezoelectric crystal CR which may be of either the fundamental or a harmonic mode of vibration of such crystal. The frequency of oscillations of this oscillator may be varied over a slight range, however, as already explained by variable condenser 36. When the microphone circuit is energized by closing switch 21 variations of microphone resistance as caused by speech, for example, produce audio variations of the screen grid voltage of the tube 15. These audio variations of the screen grid voltage produce corresponding amplitude variations of the oscillatory plate-cathode current of this tube so that a component of current at the oscillator frequency but with its amplitude varying at the audio rate appears in the plate circuit of tube 15. Condenser 37 is included between the grid and plate of tube 15 to provide at the plate of this tube an oscillatory current of substantially constant amplitude which is 90 degrees out of phase with the grid-cathode voltage of this tube. Because the plate load impedance of tube 15 is a tuned resonant circuit, it acts substantially as a nonreactive load at the resonant frequency. For this reason, the amplitude-varying plate current already described is in phase with the grid-cathode voltage. As a result, there appears at the plate electrode of tube 15 two radio frequency currents, one having a relatively constant amplitude and 90° out of phase with the grid driving voltage, and the other being an amplitude modulated signal in phase with the grid driving voltage. The addition of these two currents having quadrature phase relationship produces a phase modulated signal across the plate tank circuit including inductance 38 shunted by its distributed capacitance. Fig. 2 illustrates by means of a vector diagram the way in which phase modulation is obtained by the vector addition of such currents. The constant amplitude current of oscillator frequency which is fed through condenser 37 to the plate of tube 15 may be represented by vector OA having an angular velocity corresponding to the natural oscillatory frequency of the oscillator organization. Various magnitudes of the amplitude-varying current appearing on the plate of tube 15 as a result of tube conduction may be represented by vectors $OB^1$, $OB^2$, and $OB^3$ each having the same average angular velocity as vector OA. Specifically, the length of vector $OB^1$ represents the amplitude of the radio frequency tube current for zero amplitude of the modulating voltage. Similarly, the lengths of vectors $OB^2$ and $OB^3$ represent the current amplitude as the modulating voltage respectively alternates below and above its zero amplitude. The vector addition of these two currents may then be represented by the corresponding resultant vectors $OR^1$, $OR^2$, or $OR^3$, corresponding to the various amplitudes of the modulated current. Since the resultant current for zero modulation is represented by the vector $OR^1$, Fig. 2 shows that the phase of the resultant current in response to a modulated voltage varies or "flutters" about its normal position $OR^1$ thereby producing a voltage across the plate load impedance that is effectively phase modulated.

With respect to the stages of the transmitter following the oscillator-modulator 9, the first tripler 10 includes electron tube 16 which is provided with class C bias by means of grid current passing through resistor 46 connected between the grid of this tube and ground for a portion of each cycle of the input voltage. Condenser 39 may be considered as shunting resistor 46 by connecting the control grid of tube 16 through this condenser 39, inductance 38, and the various decoupling resistors 26, 27, 28, and 29 and through battery 24 to ground. Thus, although grid current is drawn only when the grid-cathode voltage is positive during the peaks of the positive half cycles of input voltage to tube 16, the discharge of condenser 39 during the remainder of a cycle of input voltage maintains a relatively steady direct voltage on the grid of this tube. The plate of tube 16 is connected through inductance 47, shunted by condenser 48, to the junction of resistors 26 and 27. The lower terminal of inductance 47 is connected through by-pass condenser 49 to ground.

Operation of the first tripler 10 as a class C amplifier ensures that the plate output of this tube will contain numerous harmonics. Thus, by tuning the plate tank circuit including inductance 47 and condenser 48 of this tube to the third harmonic of its input, this tuned circuit will act as a very high impedance only for the desired third harmonic frequencies, thereby ensuring that the output voltage across this tuned circuit will be predominantly of this frequency. Since the various other harmonics including the fundamental and second harmonics will also appear in the plate circuit of tube 16, the selectivity characteristics of the plate tank circuit including inductance 47 and condenser 48 must be such as to properly distinguish between the desired third harmonic and the various other harmonics. For this reason, condenser 48 is included rather than relying upon the distributed capacitance of the inductance 47 for, by increasing the capacitance of this tuned circuit, a more favorable ratio of inductance to capacitance is obtained resulting in improved selectivity characteristics. As in the oscillator-modulator 9, tuning of the output tank circuit is accomplished by varying the permeability of inductance 47.

The amplifiers 11 and 12 are operated in a similar manner to that of the first tripler 10. Thus, the second tripler 11 multiplies the modulated signal by a factor of three and the first doubler 12 by a factor of 2. The first doubler 12, as can be seen in Fig. 1, does not include a condenser in parallel with its plate load impedance 50. Although strongly selective characteristics are required of the plate tank circuit of tube 18 as well as of tubes 16 and 17, the desired output frequency of the first doubler in this embodiment of the invention is at such a high level that the distributed capacitance of inductance 50 is sufficient to provide a favorable ratio of inductance to capacitance to give the desired selectivity characteristics. The plate output voltage of tube 18 is then condenser coupled through condenser 51 to the control grid of tube 19. This tube 19 is operated in a manner similar to that of the previous tubes in that it also is provided with class C bias. The plate load impedance is adjusted, however, to provide increased power output so that this stage effectively acts as a power amplifier. The output appearing across the plate tank circuit including inductance 25 and its associated distributed capacitance is inductively coupled to antenna 14.

Although the phase modulated output of oscillator-modulator 9 has variations of amplitude, class C operation of the following frequency multipliers tends to remove substantially all of these amplitude variations. The reason for this limiting effect is that even with a beyond-cutoff bias on these tubes, the grid driving voltage applied to each tube is of sufficient amplitude to result in an instantaneously positive grid-cathode voltage for a portion of each cycle of the driving voltage. The drawing of grid current with a positive grid-cathode voltage sharply reduces the plate current so that further increases of the grid driving voltage no longer produce proportional increases of plate current. This plate current saturation limiting on positive half cycles of the grid driving voltage along with the cutoff limiting occurring on all of each negative half cycle cause the output of each class C amplifier to remain substantially constant, thereby effectively removing the undesired amplitude variations.

The various frequency multipliers following oscillator-modulator 9 also greatly increase the phase variations of the modulated output. This increase of phase variation in the transmitter output results in improved signal to noise ratio, but permits the oscillator-modulator 9 to operate with relatively small phase variations. Thus, the amplitude variations of the oscillator-modulator 9 output are minimized for, as is shown in the vector diagram of Fig. 2, the less the phase variation about the "normal" value represented by vector $OR^1$, the smaller is the variation in amplitude of the resultant vectors.

A circuit organization has thus been provided in which low-level modulation may be applied directly to the screen grid of an electron tube operated as an oscillator. Although phase modulation appears in the output of this tube its frequency of oscillation may be made exceedingly stable by the use of a piezoelectric crystal. Thus, with a minimum of apparatus the well known advantages accompanying either frequency or phase modulation are obtained and, in addition, drift in frequency of the output is minimized.

Having described a radio transmitter employing phase modulation as a specific embodiment of the present invention, it should be understood that this form is selected to facilitate in the disclosure of the invention rather than to limit the number of forms which it may assume; and it is to be further understood that various modifications, adaptations, and alterations may be applied to the specific form shown to meet the requirements of practice without in any manner departing from the spirit or scope of the present invention.

What I claim is:

1. A combined oscillator-modulator for producing a phase modulated output comprising, an electron discharge tube of the pentode type, a control grid-cathode circuit for said tube including in parallel a piezoelectric crystal and shunting capacitor and grid leak resistor, a plate-cathode circuit for said tube including an inductive circuit element and resonated at substantially the frequency of oscillation of said oscillator, a capacitor connecting said plate and said control grid to provide a component of plate current in said cathode-plate circuit having substantially constant amplitude, means for applying a direct current voltage and a superimposed alternating modulation voltage to the screen grid of said tube to produce an amplitude varying component of plate current in said plate-cathode circuit, said component of plate current of substantially constant amplitude and said component of plate current of varying amplitude having substantially quadrature phase relationships and combining in said plate-cathode circuit to provide a resultant current having phase variations.

2. A combined oscillator-modulator for producing a phase modulated output comprising an electron tube of the pentode type, a plate-cathode circuit including an inductive circuit component and tuned to resonate at substantially the frequency of oscillation of said oscillator, a control grid-cathode circuit including a piezoelectric crystal to control the frequency of oscillation of said oscillator and also including a shunting capacitor and grid-leak resistor, circuit means for applying a direct-current voltage and also a superimposed modulating voltage having relatively low frequency characteristics as compared to said frequency of oscillation to the screen grid of said tube, said modulating screen voltage causing an amplitude varying current component at said oscillator frequency to appear in said plate-cathode circuit, a capacitor connected between said plate and said control grid and causing a component of unmodulated current at said oscillator frequency to flow in said plate-cathode circuit, said modulated and said unmodulated current components having substantially quadrature phase relationships and combining in said plate-cathode circuit to provide a phase-modulated voltage across said parallel-connected inductive and capacitive circuit element.

References Cited in the file of this patent

UNITED STATES PATENTS

| Number | Name | Date |
|---|---|---|
| 1,917,102 | Dome | July 4, 1933 |
| 2,371,285 | Crosby | Mar. 13, 1945 |
| 2,402,148 | Crosby | June 18, 1946 |
| 2,498,809 | Haner | Feb. 28, 1950 |
| 2,515,030 | Belaskas | July 11, 1950 |
| 2,519,000 | Smeltzer | Aug. 15, 1950 |